Patented Oct. 15, 1929

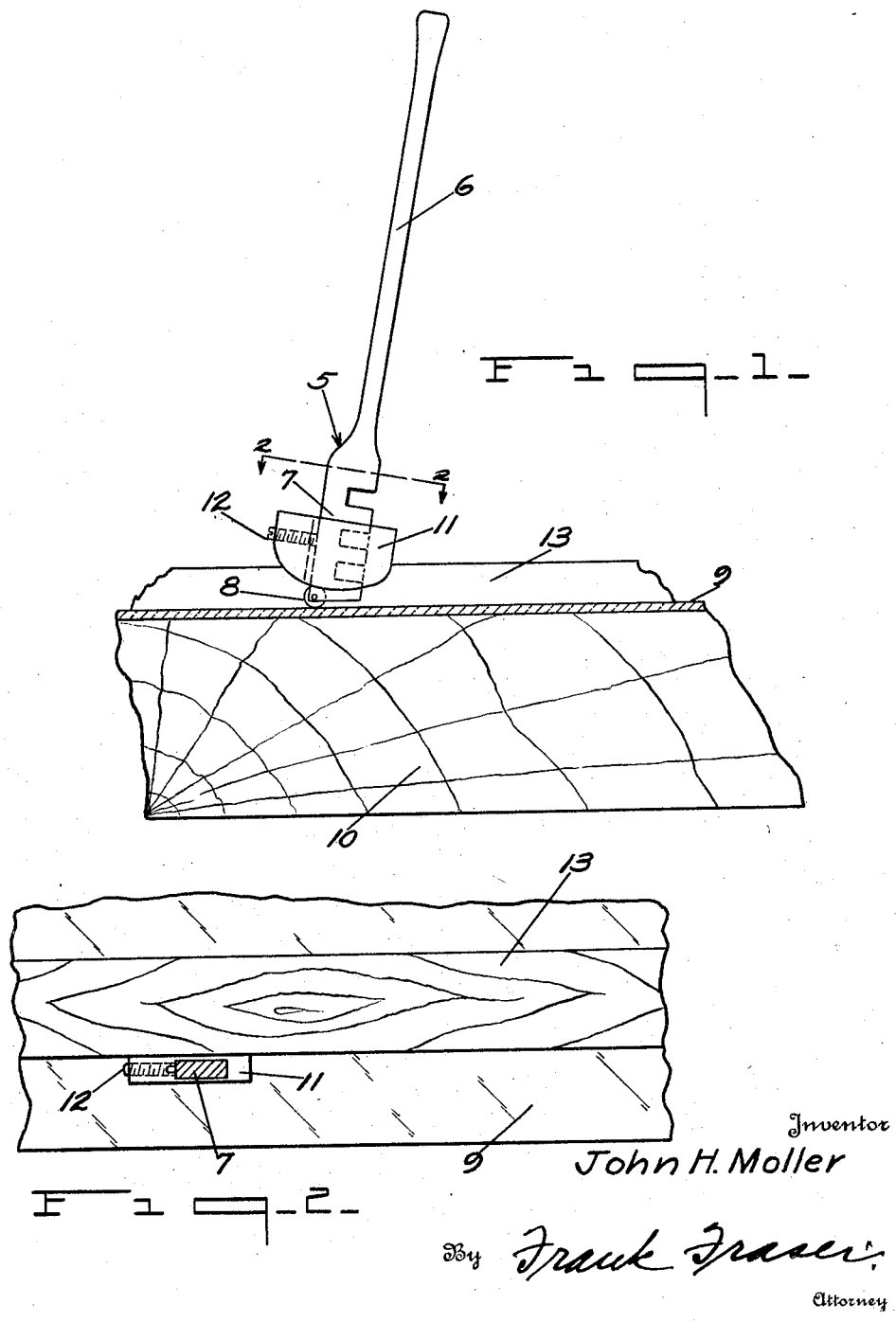

1,731,257

UNITED STATES PATENT OFFICE

JOHN H. MOLLER, OF CHARLESTON, WEST VIRGINIA, ASSIGNOR TO THE LIBBEY-OWENS GLASS COMPANY, OF TOLEDO, OHIO, A CORPORATION OF OHIO

GLASS-CUTTING APPARATUS

Application filed February 5, 1927. Serial No. 166,054.

This invention relates broadly to glass cutters, and more particularly to that type of cutter which is held in the hand and drawn across the sheet of glass to be cut.

An important object of the present invention is to provide a glass cutter of the above character including means whereby the same may be accurately guided across the sheet of glass to be cut.

A further object of the invention is to provide improved sheet glass cutting apparatus including a cutter adapted to be held in the hand and moved across the sheet to be cut, a guide member carried by said cutter, and a straight edge with which said guide member is adapted to contact as the cutter is moved across the sheet.

Other objects and advantages of the invention will become more apparent during the course of the following description when taken in connection with the accompanying drawings.

In the drawings wherein like numerals are employed to designate like parts throughout the same, Fig. 1 is an elevation of a glass cutter and improved guiding apparatus therefor constructed in accordance with the present invention, and Fig. 2 is a section taken on line 2—2 of Fig. 1.

The improved glass cutting apparatus provided by the present invention includes a cutter comprising a body portion designated in its entirety by the numeral 5 and including an elongated handle 6 preferably of steel metal, said handle being provided at its lower end with a head 7 carrying the cutting tool 8 preferably, though not necessarily, in the form of a small bevelled-edge hard steel wheel.

The cutter above described is of a conventional construction, and as shown is adapted to be held in the hand and moved across the sheet of glass 9 whereby to score the same. The glass to be cut is preferably supported upon a flat top table or other suitable support 10. Carried by the head 7 of the cutter is a guide member or block 11 removably secured in position by means of a suitable set screw 12. The guide member 11 is preferably constructed from a single piece of material provided with a centrally located slot for receiving the head 7 therethrough, although of course it will be apparent that the guide member can be made in two sections if desired, and bolted, clamped or otherwise secured together.

When using the cutter, a straight edge 13 is first laid upon the glass 9 at the desired point, after which the cutter is drawn across the glass with the guide member 11 pressed firmly against the straight edge 13. In this manner, the cutter is accurately guided across the sheet to insure a straight cut. The corners of the guide member 11 should be clean and sharp so that there will be provided a relatively large flat surface contacting with the straight edge 13 whereby to prevent the cutter from turning in the hand.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In combination, sheet glass cutting apparatus including a cutter adapted to be held in the hand and moved across the sheet to be cut, a guide member removably carried by said cutter, and a straight edge adapted to rest upon the sheet and with which the guide member is adapted to contact and along which it is adapted to slide as the cutter is moved across the glass.

2. A glass cutter adapted to be held in the hand and moved across the sheet to be cut, said cutter including a body portion carrying a cutting tool, and a guide block removably carried by said body portion and adapted to guide said cutter across the sheet.

Signed at Charleston, in the county of Kanawha and state of West Virginia, this first day of February, 1927.

JOHN H. MOLLER.